J. S. Colvin.
Piston Packing.
N⁰ 25,724.      Patented Oct. 11, 1859.

Witnesses:
Aug. Hartje
R. Wilson Conan

Inventor:
James S Colvin

UNITED STATES PATENT OFFICE.

JAMES S. COLVIN, OF ALLEGHENY, PENNSYLVANIA.

IMPROVED GASKET FOR STEAM AND OTHER JOINTS.

Specification forming part of Letters Patent No. 25,724, dated October 11, 1859.

*To all whom it may concern:*

Be it known that I, JAMES S. COLVIN, of Allegheny city, in the county of Allegheny and State of Pennsylvania, have invented a new and useful Improvement in Gaskets for Steam and other Joints; and I do hereby declare that the following is a full, clear, and exact description of the same, reference being had to the accompanying drawings, forming part of this specification, in which—

Figure 1:
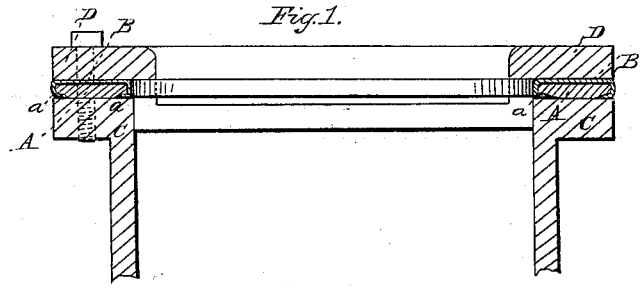
Figure 2:
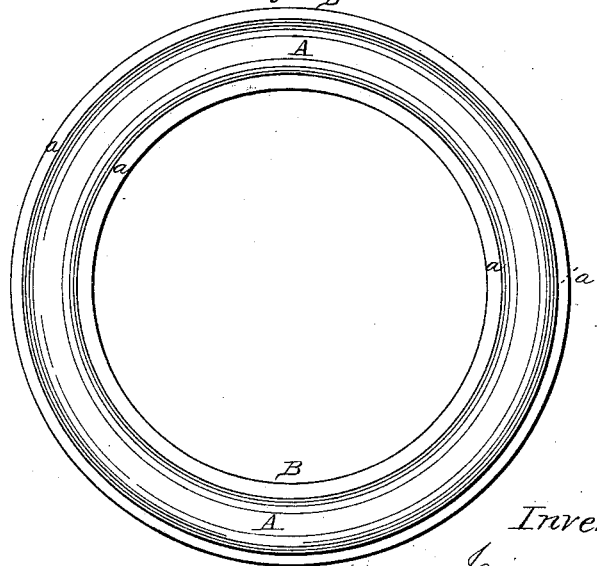

Figure 1 exhibits a transverse section of one of my improved gaskets, exhibiting its application to a joint. Fig. 2 is a face view of the gasket.

Similar letters of reference indicate corresponding parts in both figures.

The several materials at present employed for gaskets in making steam-joints are all liable to serious objections. Copper, which makes the safest joint, requires to be so tightly screwed up as to produce frequent breakage of bolts and caps. Lead is liable in a less degree to the same objection, and, besides, seldom makes a perfectly-tight joint, and india-rubber, which is in some respects the best, is liable to blow or squeeze out or to be destroyed in removing the caps.

The object of the present invention is to obviate these difficulties; and to this end the nature of the said invention consists in making a gasket of a ring of india-rubber, partly incased with copper or other tough but ductile metal, by which means I combine the safety and neatness of the copper gasket with the steam-tight quality possessed by india-rubber, besides obviating the necessity of such tight screwing up as to be liable to break the bolts and caps and preventing the gaskets being injured by the removal of the caps or other portions of the joints.

To enable others to make and use my invention, I will proceed to describe its construction and application.

To make the gasket I take a ring A, of vulcanized india-rubber, of a thickness equal to or greater than that commonly employed for gaskets, and a ring B, of thin sheet metal, preferably copper, of such size that when the india-rubber is laid upon it there will be a sufficient margin at the interior and exterior to lap over and inclose the edges of the india-rubber, and with a suitable tool turn the edges of the metal tightly over the edges of the india-rubber in the manner shown at *a a* in Figs. 1 and 2, leaving the greater portion of one side of the india-rubber ring exposed, so that the gasket presents a metal face on one side and an india-rubber face on the other side. This gasket is applied to the joint and screwed up in the usual manner with the india-rubber face toward that part of the joint to which it is desired to adhere when the cap or movable portion of the joint is removed. In the example represented the india-rubber face is next the lower or stationary portion C of the joint and the metal face next the cap or movable portion D, so that when the latter is removed the gasket remains undisturbed and adhering to the former portion.

In this gasket the metal confines the rubber laterally, so that it cannot be squeezed or blown out from the sides of the joint, and the rubber permits the metal to have the ductility to make the metallic face of the gasket adapt itself to the surface of the joint next which it is placed.

What I claim as my invention, and desire to secure by Letters Patent, is—

A joint-gasket composed of a ring of india-rubber incased with copper or other metal, substantially as herein described.

JAMES S. COLVIN.

Witnesses:
AUG. HARTJE,
R. WILSON COWAN.